March 25, 1941.   C. C. FARMER   2,236,263
SLACK ADJUSTING APPARATUS
Filed Oct. 31, 1939   3 Sheets-Sheet 1
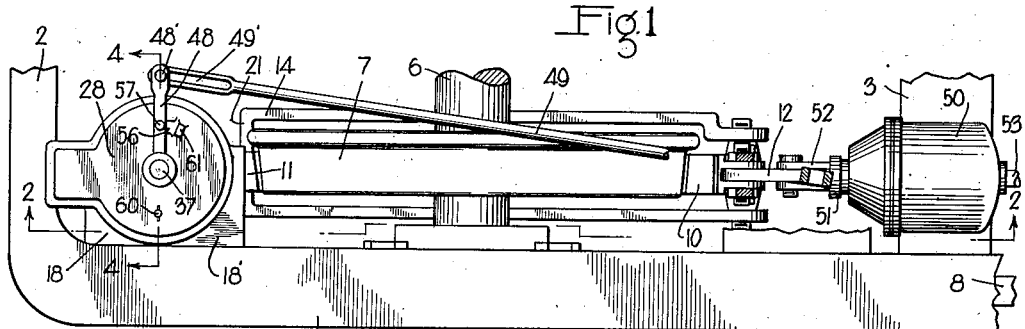
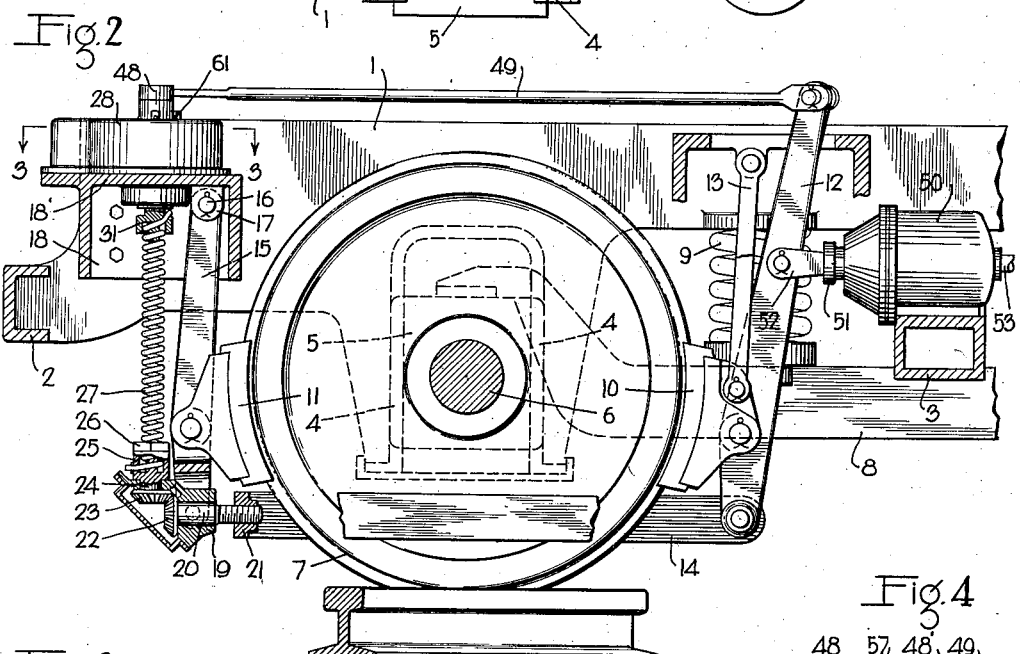
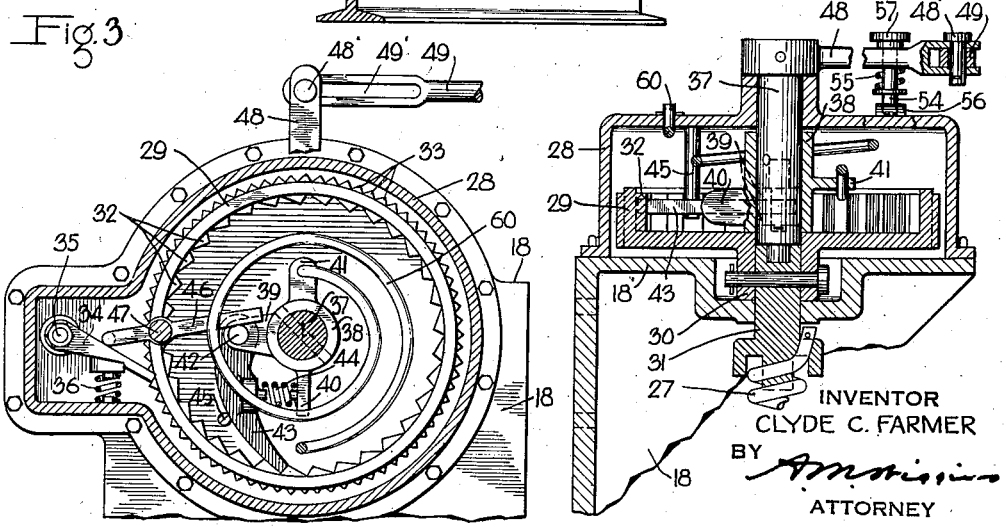
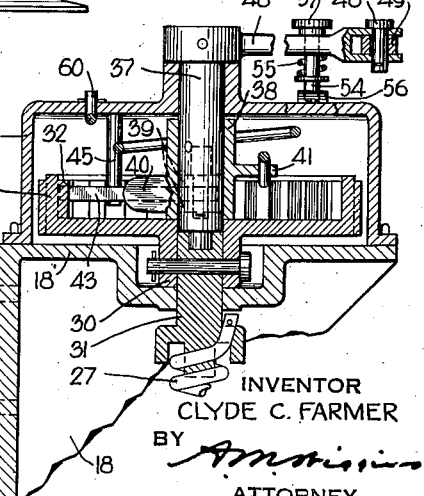
INVENTOR
CLYDE C. FARMER
BY
ATTORNEY March 25, 1941.   C. C. FARMER   2,236,263
SLACK ADJUSTING APPARATUS
Filed Oct. 31, 1939   3 Sheets-Sheet 2
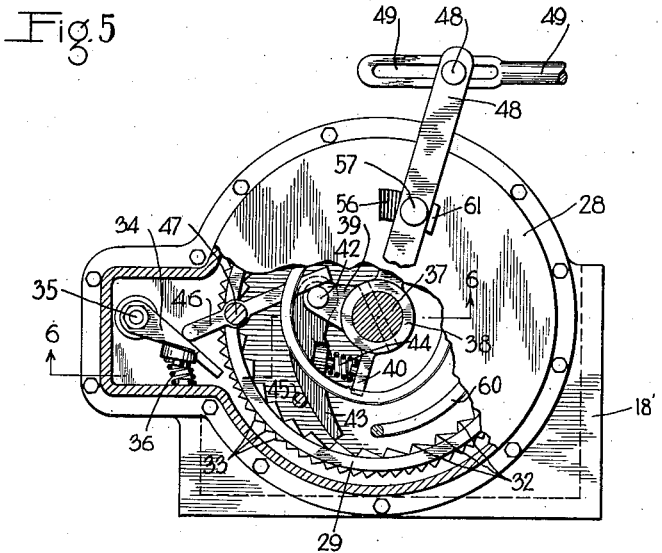
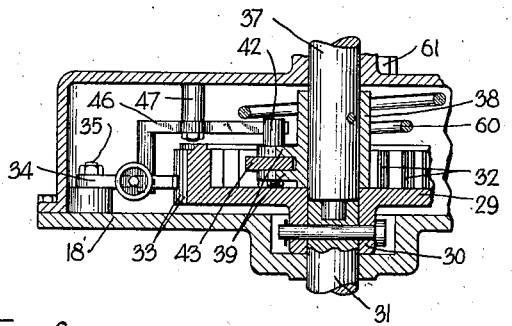
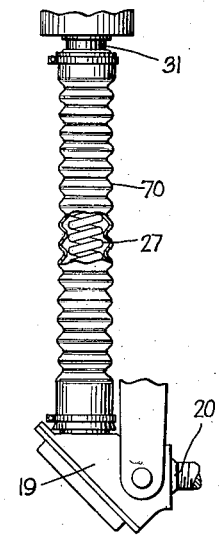
INVENTOR
CLYDE C. FARMER
BY
ATTORNEY March 25, 1941.    C. C. FARMER    2,236,263
SLACK ADJUSTING APPARATUS
Filed Oct. 31, 1939    3 Sheets-Sheet 3
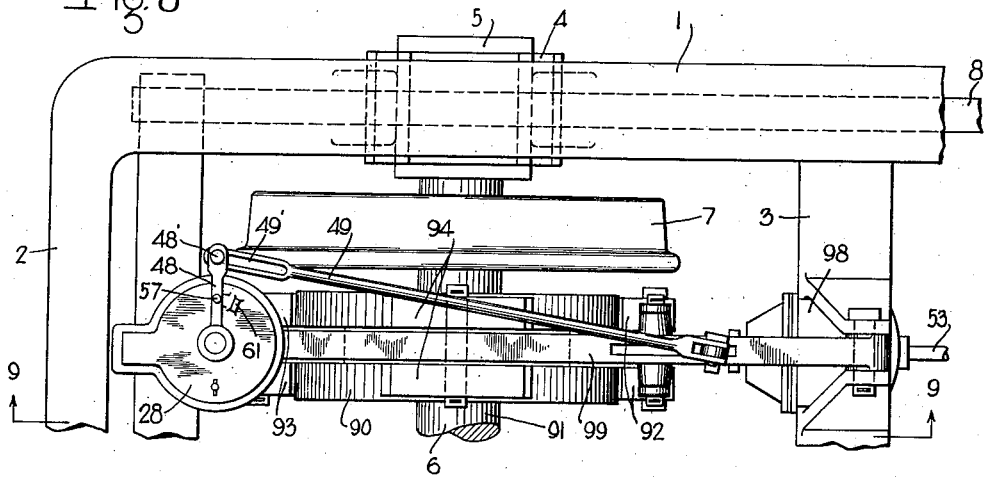
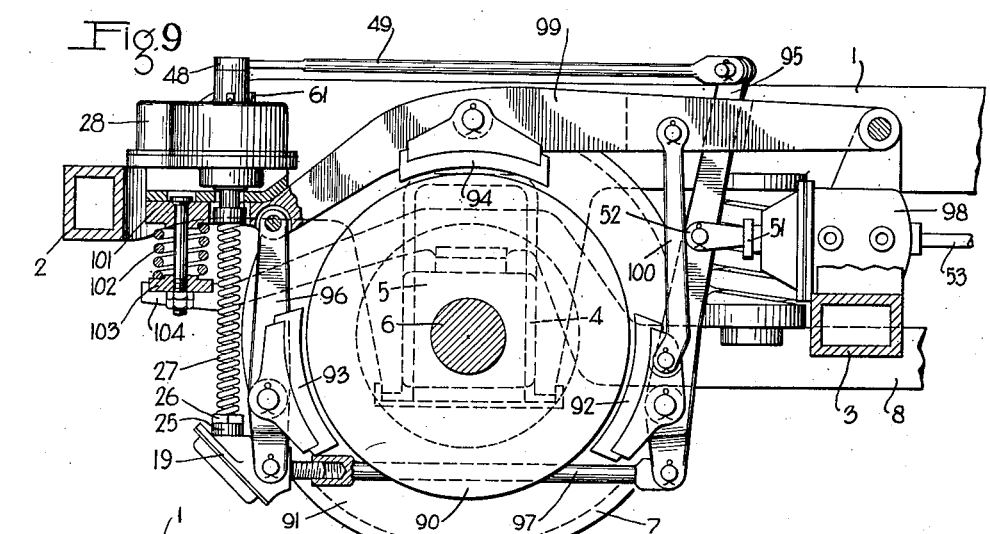
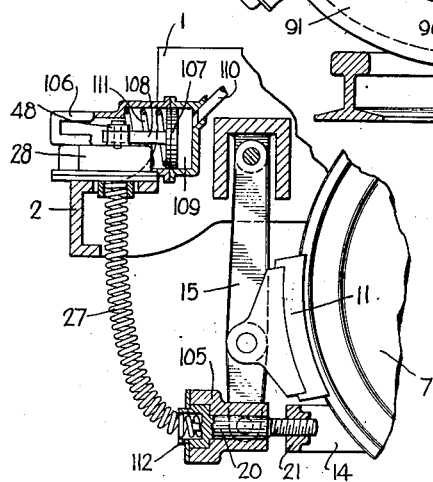
INVENTOR
CLYDE C. FARMER
BY
ATTORNEY Patented Mar. 25, 1941

2,236,263

UNITED STATES PATENT OFFICE 2,236,263

SLACK ADJUSTING APPARATUS

Clyde C. Farmer, Pittsburgh, Pa., assignor to The Westinghouse Air Brake Company, Wilmerding, Pa., a corporation of Pennsylvania Application October 31, 1939, Serial No. 302,139

16 Claims. (Cl. 188—202)

This invention relates to railway vehicle truck brake mechanisms and more particularly to that type of mechanism which embodies automatically operable means for taking up slack in the mechanism due to wear of the friction braking elements and associated parts of the mechanism.

In truck brake mechanisms and especially in brake mechanisms of the clasp type it is difficult to effect adjustments to take up slack without causing excessive angularity of the usual operatively connected dead and live levers. To overcome this difficulty it has therefore been proposed to mount an automatically operative slack adjusting engine or other driving mechanism on the connecting rod which operatively connects the dead and live levers together. While this arrangement will provide the desired adjustment without producing excessive angularity of the brake levers, it is nevertheless objectionable in that the adjusting engine or other driving mechanism will be subjected to heavy vibrations which may be set up in the brake mechanism. This arrangement is further objectionable in that the adjusting engine or other driving mechanism will be in a position where it is liable to be damaged by water, and flying particles, such as dust and ballast material or the like which may be picked up along the road bed when the truck is in motion.

The principal object of the invention is to provide an automatic slack adjusting mechanism for varying the effective length of a connecting rod of a railway vehicle truck brake mechanism which will be free from the above mentioned difficulties and objections.

This object is attained by providing the connecting rod with a slack take-up mechanism for varying the effective length of the connecting rod and by mounting on the frame of the truck, in a location remote from the track rails, a driving apparatus which is operative to actuate the slack take-up mechanism, the apparatus in this position being well out of the way of flying particles of ballast or the like which may be picked up from the road bed.

Another object of the invention is to provide a flexible driving connection between the above mentioned driving apparatus and slack take-up mechanism of the slack adjusting mechanism whereby relative movement between the truck frame and brake mechanism in any direction will not impair the operation of the slack adjusting mechanism. This flexible connection makes it possible to mount the driving apparatus on the truck frame where it is free from shock due to vibration of the mechanism when the truck is in motion.

A further object of the invention is to make the above mentioned driving connection in the form of a spring in which there is adapted to be stored up, in effecting an application of the brakes, sufficient energy to effect the operation of the slack take-up mechanism, upon a subsequent release of the brakes, to shorten the effective length of the connecting rod of the mechanism.

Other objects and advantages will be apparent from the following more detailed description of the invention.

In the accompanying drawings, Fig. 1 is a fragmentary plan view of a portion of a railway vehicle truck and brake mechanism embodying the invention; Fig. 2 is a vertical sectional view of the same taken on the line 2—2 of Fig. 1; Fig. 3 is a cross-sectional view of a portion of the slack adjusting mechanism taken on the line 3—3 of Fig. 2; Fig. 4 is an enlarged vertical sectional view of that portion of the mechanism shown in Fig. 3 and is taken on the line 4—4 of Fig. 1; Fig. 5 is a plan view of that portion of the mechanism shown in Fig. 3, portions of the casing being broken away to more clearly illustrate certain operating characteristics of the apparatus; Fig. 6 is a vertical sectional view taken on the line 6—6 of Fig. 5 and Fig. 7 illustrates a slight modification of the invention. Fig. 8 is a fragmentary plan view similar to Fig. 1 but illustrating the invention applied to a different type of brake mechanism and truck; Fig. 9 is a vertical sectional view of the same taken on the line 9—9 of Fig. 8; and Fig. 10 is a fragmentary vertical sectional view showing a modification of the invention applied to a truck and brake mechanism of the type shown in Figs. 1 and 2.

The truck illustrated in Figs. 1 and 2 is of the equalizer type and may comprise the usual truck frame having laterally spaced side pieces 1 which are connected together in the usual well known manner at each end by an end piece 2 and intermediate their ends by spaced transoms 3.

Adjacent each end of the truck each side piece 1 is provided with spaced pedestal jaws 4 which straddle and are slidably guided vertically upon an axle box 5 which is carried by the outer end of the axle 6 secured to the truck wheel 7. The truck further comprises an equalizer bar 8 which extends longitudinally of the truck and rests at each end upon an axle box 5. The truck frame is supported for vertical movement relative to the wheel 7 through the medium of springs 9 which are carried by the equalizer bars 8.

The brake mechanism shown is of the type which is complete for one wheel of the truck and in view of this only those parts of the truck which are necessary to a clear understanding of the invention has been shown, and the following description of the invention will, for simplification be more or less limited to what is shown.

The brake mechanism shown comprises brake elements 10 and 11 which are disposed in clasp arrangement about the wheel and which are movable into and out of frictional braking engagement with the tread surface of the wheel. Each of these brake elements may comprise the usual brake head and brake shoe which are secured together in the usual manner and since this combination of brake head and shoe is so well known in the brake art each element will, for the sake of simplifying the description, be hereinafter referred to by the term brake shoe.

The brake shoe 10 is pivotally connected to a vertically disposed live or brake cylinder lever 12 at a point located adjacent the lower end of the lever. This brake shoe is pivotally supported from the truck frame by means of a hanger 13, and the lever 12 in turn is supported by the brake shoe. The lower end of the lever is operatively connected to one end of the bottom connecting member which, in the present embodiment of the invention, is in the form of a longitudinally extending yoke 14 which straddles the wheel 7 as shown, the lever being connected to the open end of the yoke.

The brake shoe 11 is pivotally connected to a vertically disposed dead lever 15 at a point located adjacent the lower end of the lever. The upper end of this lever is pivotally carried by a pin 16 which is mounted in laterally spaced lugs 17 extending downwardly from an inwardly extending horizontally disposed top flange 18' of a bracket 18 secured to the side piece 1 of the truck frame.

Pivotally connected to the lower end of the dead lever and carried thereby is a gear box or casing 19 in which there is journaled a slack take-up member 20 that extends in a direction longitudinally of the truck to the exterior of the casing, the outer end of the member having screw-threaded connection with the closed end portion 21 of the yoke 14. The inner end of the member is provided with a bevel gear wheel 22 through the medium of which the member is adapted to be rotated. This gear wheel meshes with a corresponding bevel gear wheel 23 which is secured to a short vertically disposed driving shaft 24 journaled in the gear casing.

Exteriorly of the gear casing the driving shaft 24 is provided with a hollow extension 25 having an exterior hexagonal upper portion 26 which, as will hereinafter more fully appear is adapted to be engaged by a wrench or other suitable tool for manual operation of the driving shaft.

Extending into the hollow portion 25 and anchored thereto is the lower end of a vertically disposed flexible driving element which, in the present embodiment of the invention, is in the form of a coil spring 27, which spring, as will hereinafter more fully appear, is adapted to effect the rotation of the driving shaft 24 and thereby the bevel gear wheels 23 and 22 and take-up member 20. This spring, as will also hereinafter more fully appear is adapted to be wound up when the brakes are being applied if there is slack in the brake mechanism to be taken up and is adapted to act, under the influence of the power stored up therein, to rotate the shaft 24 upon the subsequent release of the brakes.

For the purpose of winding up this spring 27, a winding apparatus is provided which is carried by the truck frame bracket 18. This apparatus comprises a casing which is formed by the horizontal top flange 18' of the bracket 18 and a cover portion 28 which is rigidly secured to the flange. Contained in the chamber defined by the inner surface of the cap portion 28 and the upper surface of the flange 18' is a ratchet wheel 29 having a downwardly depending hub 30 which rests on the upper surface of the flange 18', which hub is rigidly secured to the upper end of a short vertically disposed rotatable shaft 31 journaled in the flange 18'. Below the flange, the lower end portion of the shaft is secured to the upper end of the spring 27 in such a manner that when it rotates it will wind up the spring.

The ratchet wheel is provided with spaced internal teeth 32 through the medium of which the ratchet wheel is adapted to be driven in its spring winding direction and is further provided with external teeth 33 which are adapted to be engaged by a pawl 34 pivotally mounted on a vertical disposed pin 35 carried by the flange 18' for preventing unwanted reverse rotation of the ratchet wheel by the action of the spring 27. This pawl is normally urged into holding engagement with one of the teeth 33 by a spring 36 which is interposed between and operatively engages the pawl and the cap portion of the casing.

Rotatably journaled in the upper end of the shaft 31 and the cap section of the casing is a vertically disposed shaft 37 which is axially aligned with the shaft 31. Encircling the shaft 37 and rigidly secured thereto is a sleeve member 38 having spaced radially extending arms 39, 40 and 41. The arm 39 have pivotally connected thereto, by means of a vertically disposed pin 42, the inner end of a driving pawl 43, the outer end of the pawl being normally held in operative driving engagement with one of the teeth 32 of the ratchet wheel by means of a coil spring 44 which is interposed between the arm and pawl. The outer longitudinal edge of this pawl is convex in shape, and with the pawl in its normal position as shown in Fig. 2, this edge contacts a pin or lug 45 which is rigidly carried by the cap portion of the casing.

The pivot pin 42 for the driving pawl 43 is of such a length that its upper end portion extends a short distance above the upper arm 39 of the sleeve member 38 as shown in dotted lines in Fig. 4. This portion of the pin, with the arms 39 in their normal position as shown in Fig. 3, engages the inner end of a pawl throw out lever 46 which is pivotally mounted on a pin or lug 47 rigidly carried by the cap portion of the casing as best shown in Fig. 6. This lever is disposed above and passes over the top edge of the ratchet wheel, and at its outer end operatively engages the pawl 34.

Located exteriorly of the upper wall of the cap portion of the casing is an actuating arm 48 which is rigidly secured at one end to the upper end of the shaft 37. The outer end of this lever has a lost motion connection with one end of an operating rod 49 so as to permit a limited longitudinal movement of the rod relative to the arm. The other end of the rod is operatively connected to the upper end of the brake cylinder lever 12. The lost motion connection between the arm 48 and the rod 49 comprises a vertically disposed pin 48' which extends through the arm 48 and a slot 49' formed in the rod 49 for the accommodation of the pin, the slot being of limited length. When the brakes are released the pin will be in contact with the rod at the outer end of the slot as shown in Figs. 1 and 3.

For effecting the operation of the brake mechanism a brake cylinder device is provided which, in the present embodiment of the invention is rigidly secured to a transom 3 of the truck. This device may be of the usual well known construction having a casing 50 in which there is operatively mounted a piston, not shown, having a piston rod 51 which is adapted to actuate a push rod 52. The outer end of the push rod is operatively connected to the brake cylinder lever 12 at a point located between the upper end of the lever and the brake shoe 10. The device may also comprise the usual release spring, not shown.

The arm 48 has slidably mounted therein for vertical movement a vertically disposed stop pin 54 which is normally held in its lowermost position, as best shown in Fig. 4, by a spring 55. The lower end of this pin is adapted to engage a rigid stop lug 56 projecting upwardly from the upper wall of the cap section of the casing, and this interengagement of the pin and lug prevents unwanted movement of the arm and associated parts in a counterclockwise direction beyond their normal position. The upper end of the pin is provided with a head 57 whereby the pin may be manually raised out of the plane of the stop lug 56 when it is desired to manually actuate the slack take-up mechanism.

In operation when it is desired to effect an application of the brakes, fluid under pressure is admitted to the brake cylinder device by way of pipe 53, causing the brake cylinder piston and rod 51 to move the push rod 52 outwardly, i. e., in the direction toward the left hand as viewed in Fig. 2. The push rod in its traverse actuates the brake cylinder lever 12 and thereby the yoke 14 and dead lever 15 in the usual manner to force the brake shoes 10 and 11 into frictional braking engagement with the tread surface of the wheel 7.

It will here be noted that the lever 12 as it is actuated toward its braking position, as just described, moves the operating rod 49 longitudinally relative to the pin 48', and if there is no slack to be taken up in the brake mechanism, the rod 49 will not move far enough for the rear end of the slot 49' to engage the pin, consequently there will be no adjusting operations of the slack adjusting apparatus by the rod 49.

As wear of the brake shoes 10 and 11 and associated parts of the brake mechanism wear away the operating rod 49 will be moved further in the direction of the left hand and will cause the arm 48 and thereby the shaft 37, arms 39, 40 and 41 and driving pawl 43 to be moved in a counterclockwise direction. Now since the pawl 43 is in engagement with a tooth 32 of the ratchet wheel, it will impart rotary movement in the same direction to the ratchet wheel and the ratchet wheel will in turn impart rotary motion to the shaft 31 thereby winding up the spring 27. As the ratchet wheel is thus moved, the pawl 34 will ratchet over the tooth 33 which is located next to the tooth with which the pawl is shown in engagement in Fig. 3.

When it is desired to release the brakes, fluid under pressure is discharged from the brake cylinder by way of the pipe 53, thus permitting the brake shoes and several parts of the brake mechanism to return to their release positions in the usual manner. It should here be mentioned that when the brakes are applied, the frictional resistance of the take-up member 20 is great enough to prevent its rotation by the energized spring 27, so that during the application of the brakes there will be no slack take-up operation of the member. When, however, the brakes are released this frictional resistance is reduced, so that the energized spring acts to rotate the member. When the member is thus rotated, the screw-threaded connection between the member and the yoke 40 act to draw the lower ends of the levers 12 and 15 and brake shoes carried thereby toward each other, thus automatically taking up the slack in the brake rigging. It will here be noted that since the pawl 34 is in locking engagement with a tooth 33 of the ratchet wheel, the springs cannot move the ratchet wheel in a clockwise direction, so that the full power of the energized spring is utilized for actuating the member.

To insure the return of the arm 48 to its normal position in releasing the brakes, a coil spring 60 is provided having one end anchored to the arm 41 of the sleeve 38 and the other arm anchored to the upper wall of the cap portion of the casing as best shown in Figs. 1 and 4, and this spring acts at all times to urge the arm 48 toward its normal position.

When it is desired to provide or let out slack in the brake mechanism, as would be the case when replacing worn shoes with new ones, the workman by the use of the head 57 raises the stop pin 54 in the arm 48 out of engagement with the stop lug 56 on the cap section of the casing. When this is accomplished the spring 60 acts to rotate the sleeve 38 and thereby the driving pawl 43, shaft 37 and arm 48 in a clockwise direction. The pin 42 moves with the sleeve and rocks the lever 46 in a counterclockwise direction about its pivot pin 47, the lever as it is thus moved, moving the pawl 34 out of locking engagement with the ratchet wheel 29. As the arm 48 reaches the position in which it is shown in Fig. 5, the stop pin 54 will engage with a second stop lug 61 provided on the exterior of the upper wall of the cap section of the casing, which inter-engagement brings the arm and thereby the shaft 37, sleeve 38, pawl 43, lever 46, and pawl 34 to a stop. As the pawl 43 is being rotated by the sleeve 38 the pin 45 acts to force the pawl out of engagement with the ratchet wheel.

With the pawls 34 and 43 thus moved out of the path of travel of the teeth 33 and 32, respectively, the ratchet wheel 29 is free to be rotated in either direction, so that the workman may, by the use of a wrench applied to the hexagonal portion 26 of the shaft 24 rotate the shaft and thereby the meshing gear wheels 23 and 22 and take-up member 20 to properly adjust the brake mechanism.

After the brake mechanism has been adjusted, the operator moves the arm 48 back to its normal position, causing the pawls 34 and 43 to be moved into engaging relationship with the ratchet wheel 29 as shown in Fig. 3.

If for any reason the spring 60 does not act to move the arm 48 from the position in which it is shown in Fig. 3, to the position in which it is shown in Fig. 5 when the stop pin is raised out of engagement with the lug 56, the workman may of course effect such movement.

From the foregoing description it will be apparent that as the dead lever and consequently the gear box 19 and several parts carried by the gear box move relative to the truck frame in applying and releasing the brakes, the spring 27 flexes to accommodate such movement but at the same time remains operative to effect adjustment of the take-up member. This spring also absorbs shocks set up in the brake mechanism and thereby prevents them from being transmitted to the slack take-up driving apparatus carried by the truck frame. When, due to wear, there is relative vertical movement between the dead lever 15 and the truck frame, the spring 27 will flex longitudinally to accommodate such movement but will remain operative to effect the operation of the slack take-up apparatus.

In some instances it may be desired to protect the spring 27 against the collection of foreign matter such as snow, ice, dust or other material which may be picked up from the road bed. In such instances the spring may, as shown in Fig. 7 be enclosed in a flexible protective covering or boot 70 which may be securely clamped at one end to the portion 25 of the shaft 24 and at the other end to the outer end of the shaft 31.

In Figs. 8 and 9 the slack adjusting apparatus is shown embodied in a brake mechanism of multiple shoe drum type such as shown in an application for United States Letters Patent of Carlton D. Stewart, Serial No. 214,517, filed June 18, 1938, now Patent No. 2,177,953, dated Oct. 31, 1939.

As shown in these figures the vehicle truck frame is substantially of the same construction as the truck frame shown in Figs. 1 and 2.

The brake mechanism comprises a brake drum 90 which is secured to a wheel and axle assembly 91 of the vehicle truck for rotation with the assembly. Arranged about the outer or peripheral braking surface of the drum are spaced brake shoes 92, 93 and 94 which are adapted to be moved into and out of frictional braking engagement with the braking surface of the drum. The brake shoes 92 and 93 are disposed in clasp arrangement with relation to the brake drum and are adapted to be operated by means of a brake cylinder lever 95 and a dead lever 96, respectively, operatively connected together at their lower ends by a bottom connecting rod 97. For actuating the brake cylinder lever and thereby the dead lever 96, a brake cylinder device 98 is provided which is carried by a transom 3 of the frame of the vehicle truck.

Located above the brake drum and extending longitudinally of the truck is a beam 99 which is pivotally connected at one end to the truck frame to permit vertical rocking movement of the member relative to the brake drum.

The brake cylinder lever 95 is supported from the brake shoe 92, which shoe is in turn supported by a pair of laterally spaced hangers 100 which are pivotally carried by the beam 99. The upper end of the dead lever 96 is pivotally connected to the beam 99 and through this connection the lever is supported by the beam.

Between the levers 95 and 96 there is operatively secured to the beam 99 the brake shoe 94.

The outer end of the beam 99 is provided with an extension 101 which extends beyond the dead lever 96 and which rests on the upper end of a coil spring 102 resting on a transversely extending bar 103 which is supported at each end on a rigid longitudinal extension 104 of the equalizing bar 8 carried on the axle box 5 of the truck.

The slack adjusting apparatus may be identical in operation and construction with the apparatus shown in Figs. 1 to 7, inclusive. There is one difference, however, in that in Figs. 8 and 9 the driving mechanism is shown mounted on the extension 101 of the movable beam 99 instead of being rigidly carried by the truck frame as is the case in the apparatus shown in Figs. 1 to 7.

In Fig. 10 a modification of the invention is illustrated in connection with the clasp brake mechanism of the type shown in Figs. 1 and 2. As shown the rotatable slack take-up member 20 which is operatively mounted in a casing 105 and pivotally carried by the dead lever 15 is directly connected to the lower end of the spring 27, which spring 27 when energized or wound up by the winding mechanism is adapted to directly drive the slack take up member.

The spring winding mechanism is identical with the corresponding mechanism shown in Figs. 1 to 7, inclusive, but is carried by the end piece of the truck frame.

Instead of employing the brake cylinder lever 12 to actuate the winding mechanism as is done in the mechanism shown in Figs. 1 to 2, a fluid pressure cylinder device 106 is provided for this purpose.

This cylinder device is rigidly secured to an end piece 2 of the truck frame and may comprise a casing having a piston 107 operatively mounted therein, which piston is provided with a stem 108 to which the outer end of the arm 48 of the winding mechanism is operatively connected.

At one side of the piston 107 there is a chamber 109 which is normally connected through a pipe 110 to the chamber at the non-pressure side of the brake cylinder piston of the usual type of brake cylinder device adapted for use with automatic slack adjusting apparatus, which brake cylinder chamber is normally in open communication with the atmosphere.

Interposed between and operatively engaging the other side of the piston 107 and the casing is a spring 111 which, as will hereinafter appear, is adapted to return the piston and thereby the winding mechanism to normal release position.

It will here be noted that the piston 107 will be maintained in its normal position, against the action of the spring 111, by the arm 48 which, in turn, is held in its normal position by the engagement of the stop pin 54 with the stop lug 56. In this position, the piston 107 will be spaced away from the pressure head of the cylinder, so that when the pin 54 is raised out of engagement with the stop lug 56, spring 111 will actuate the piston and thereby the arm 48 to move the pawls 34 and 43 of the winding mechanism out of engagement with the ratchet wheel 29 and thus condition the slack adjusting apparatus for manual operation to take up or provide slack. This manual operation is accomplished by means of a wrench or other suitable tool applied to the outer end 112 which is preferably made in the form of a nut.

In operation, when, due to wear of the brake shoes or other parts of the brake mechanism, the travel of the brake cylinder piston, in operating to effect an application of the brakes, exceeds the normal travel it opens communication between the pressure chamber of the brake cylinder and the pipe 110, so that fluid under pressure will flow from this chamber to the piston chamber 109 of the cylinder device. Fluid under pressure admitted to chamber 109 causes the piston to operate to rotate the winding mechanism in a counterclockwise direction to wind up or energize the spring 27.

When in releasing the brakes the brake cylinder piston again causes the pipe and thereby the pressure chamber 109 of the cylinder device to be connected to the non-pressure chamber of the brake cylinder device, fluid under pressure will be vented from the pressure chamber to the atmosphere by way of the non-pressure chamber of the brake cylinder device. Upon such venting the spring will cause the piston to return to its normal position.

Now when the brake shoes move out of engagement with the tread of the wheel, the energized spring acts to rotate the slack take-up member relative to the yoke 14, thus shortening the effective length of the yoke and thereby effecting the take-up adjustment of the brake shoes.

*General considerations*

It will be apparent from the foregoing description that by the use of a flexible operating connection between the slack take-up member, carried by the bottom connecting rod, and the actuating mechanism, carried at a point remote from the connecting rod, the exact positioning of the member and mechanism with relation to each other, required when rigid operating connections are employed, is eliminated. It will further be apparent that this flexible operating connection will permit relative movement between the slack take-up member and the actuating mechanism and thereby prevent binding action between these parts which would otherwise occur.

By utilizing a spring as the flexible connection the two above mentioned features are obtained and the spring is further utilized to store up energy for actuating the slack take up member to take up slack in the brake mechanism.

While several illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a slack adjusting apparatus for a vehicle brake rigging, a slack take-up mechanism, spring means adapted when torsioned to drive said mechanism, and means remotely located from said mechanism operative by the brake rigging for controlling the torsioning of said flexible means, said slack take-up mechanism being movable bodily relative to said means and said spring means being yieldable to such movement.

2. In a slack adjusting apparatus for a vehicle brake rigging, a slack take-up mechanism, a helical spring adapted when torsioned to drive said mechanism, and means remotely located from said mechanism operative by the brake rigging for controlling the torsioning of said spring, said take-up mechanism and means being capable of bodily movement relative to each other and said spring being yieldable to such movement.

3. In a slack adjusting apparatus for a vehicle brake rigging, a slack take-up mechanism, flexible means adapted to be wound up and thereby energized for driving said mechanism, and winding means operative by the brake rigging when the rigging is moved an excessive distance in effecting an application of the brakes for winding up said flexible means, said slack take-up mechanism and winding means being capable of bodily movement relative to each other and said flexible means being yieldable to such movement.

4. In a slack adjusting apparatus for a vehicle brake rigging, a slack take-up mechanism, a resilient member adapted to be wound up and thereby energized for driving said mechanism, means operative, only when an application of the brakes is being effected and there is a slack in the rigging to be taken up, for winding up said resilient member, means for holding the winding means against rotation by said resilient member, the holding means being movable out of holding relationship with said winding means upon movement of the winding means rearwardly of its normal position for permitting manual operation of the slack take-up mechanism without opposition by said resilient member.

5. In a slack adjusting apparatus for a vehicle brake rigging, a slack take-up mechanism, a resilient member adapted to be wound up and thereby energized for driving said mechanism, means operative, only when an application of the brakes is being effected and there is slack in the rigging to be taken up, for winding up said resilient member, said means comprising a ratchet wheel secured to said resilient member adapted, to be rotated to wind up the resilient member, a driving pawl for the ratchet wheel, a member adapted to be operated by the brake rigging for actuating said driving pawl to rotate said ratchet wheel, and a locking pawl for holding said ratchet wheel against reverse rotation by said resilient member, said member being operative manually for effecting movement of said driving pawl out of driving engagement with the ratchet wheel, and means operative upon the pawl disengaging movement of the member for moving the locking pawl out of locking engagement with the ratchet wheel.

6. In a vehicle brake rigging of the type having a plurality of brake levers which are operatively associated with each other through the medium of a connector, a slack take-up mechanism carried by one of said levers operative to decrease the effective length of the connector to take up slack in the brake rigging, a torsionable flexible member adapted when torsioned for driving said mechanism, and means remotely located from said connector and operative by the other of said levers for torsioning said flexible member.

7. In a vehicle brake rigging of the type having a plurality of brake levers which are operatively associated with each other through the medium of a connector, a slack take-up mechanism operative to decrease the effective length of the connector to take up slack in the brake rigging, a flexible member adapted to be energized for driving said mechanism, means remotely located from said connector and adapted to be rotated in one direction by the brake rigging for energizing said flexible member, a pawl for holding said means against rotation in the opposite direction by said flexible member, a portion of said means being so arranged and constructed as to be manually rotatable in said opposite direction for moving said pawl out of its holding position for permitting free manual rotation of the slack take-up mechanism in either the direction to take up slack or the direction to provide slack in the brake rigging.

8. In a vehicle brake rigging of the type having a plurality of brake levers which are operatively associated with each other through the medium of a connector, a slack take-up mechanism operative to decrease the effective length of the connector to take up slack in the brake rigging, a flexible member adapted to be energized for driving said mechanism, means remotely located from said connector and adapted to be rotated in one direction by the brake rigging for energizing said flexible member, a pawl for holding said means against rotation in the opposite direction by said flexible member, a portion of said means being so arranged and constructed as to be manually rotatable in said opposite direction for moving said pawl out of its holding position for permitting free manual rotation of the slack take-up mechanism in either the direction to take up slack or the direction to provide slack in the brake rigging, a stop normally holding said portion against movement in said opposite direction and manually operable out of its holding position to permit such movement of the portion.

9. In a vehicle brake rigging of the type having a plurality of brake levers which are operatively associated with each other through the medium of a connector, a slack take-up mechanism operative to decrease the effective length of the connector to take up slack in the brake rigging, a spring adapted to be wound up and thereby energized for actuating said mechanism, and means remotely located from said connector and operable by one of said levers when an application of the brakes is being effected and there is slack in the brake rigging to be taken up for winding up said spring.

10. In a vehicle brake rigging of the type having a plurality of brake levers which are operatively associated with each other through the medium of a connector, a slack take-up mechanism operative to decrease the effective length of the connector to take up slack in the brake rigging, a spring adapted to be wound up and thereby energized for actuating said mechanism, means remotely located from said connector and operable by one of said levers when an application of the brakes is being effected and there is slack in the brake rigging to be taken up for winding up said spring, and means locking said means against movement by said spring.

11. In a slack adjusting apparatus for a vehicle brake rigging, a slack take-up mechanism, resilient torsionable means operatively connected to said slack take-up mechanism and adapted when torsioned to actuate the mechanism, a rotatable shaft separate from the slack take-up mechanism and operative by the brake rigging to torsion the resilient torsionable means, said resilient torsionable means being yieldable to relative bodily movement between the slack take-up mechanism and said shaft.

12. In a slack adjusting apparatus for a vehicle brake rigging, a slack take-up mechanism, resilient torsionable means operatively connected to said slack take-up mechanism and adapted when torsioned to actuate the mechanism, rotatable means mounted separately from the slack take-up mechanism operative by the brake rigging for torsioning the resilient torsionable means, said resilient torsionable means being yieldable to relative bodily movement between said rotatable means and slack take-up mechanism.

13. In a slack adjusting apparatus for a vehicle brake rigging, a slack take-up mechanism, a single resilient torsionable element operatively connected to said slack take-up mechanism and adapted when torsioned to actuate the mechanism, winding means operable by the brake rigging for torsioning said element, said winding means being mounted separately from the slack take-up mechanism, and said element being yieldable to relative bodily movement between the winding means and slack take-up mechanism.

14. In a vehicle brake rigging of the type having a plurality of brake levers which are operatively associated with each other through the medium of a connector, slack take-up mechanism associated with one of said levers and said connector operative to decrease the effective length of the connector to take up slack in the brake rigging, and driving means operative by the brake rigging for actuating said slack take-up mechanism, said driving means comprising a rotatable driving element mounted separately from said slack take-up mechanism and also comprising a flexible driving connection from said driving means to said slack take-up mechanism, said flexible driving connection being yieldable to relative bodily movement between said driving means and slack take-up mechanism.

15. In a vehicle brake of the type having a plurality of brake levers which are operatively associated with each other through the medium of a connector, slack take-up mechanism carried by one of said levers and operative to decrease the effective length of said connector to take up slack in the brake rigging, a resilient torsionable element adapted when torsioned to actuate said slack take-up mechanism, and means fixedly mounted separately from said slack take-up mechanism and operative by the brake rigging for torsioning said element, said element being flexible to yield to movement of the slack take-up mechanism with the lever relative to said means.

16. In a vehicle brake of the type having a plurality of brake levers which are operatively associated with each other through the medium of a connector, slack take-up mechanism associated with one of said levers and the connector and operative to decrease the effective length of the connector to take up slack in the brake rigging, a resilient torsionable element adapted when torsioned to actuate the slack take-up mechanism, and means operative by the brake rigging for torsioning said element, said means being fixedly mounted against bodily movement and said slack take-up mechanism being movable bodily with the associated lever relative to said means, and said element being yieldable to the movement of the slack take-up mechanism relative to said means.

CLYDE C. FARMER.